(12) United States Patent
Goodman et al.

(10) Patent No.: US 10,366,723 B2
(45) Date of Patent: Jul. 30, 2019

(54) SYSTEM AND METHOD FOR DISTRIBUTING SHUTTLE CARS IN A DATA STORAGE LIBRARY SHUTTLE COMPLEX

(71) Applicant: International Business Machines Corporation, Armonk, NY (US)

(72) Inventors: Brian G. Goodman, Tucson, AZ (US); Leonard G. Jesionowski, Tucson, AZ (US); Kenny Nian Gan Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 15/496,066

(22) Filed: Apr. 25, 2017

(65) Prior Publication Data

US 2018/0308517 A1    Oct. 25, 2018

(51) Int. Cl.
  *G11B 15/68* (2006.01)
  *G11B 17/22* (2006.01)
(52) U.S. Cl.
  CPC ........ *G11B 15/689* (2013.01); *G11B 15/6835* (2013.01); *G11B 17/228* (2013.01)
(58) Field of Classification Search
  USPC ....................................................... 700/214
  See application file for complete search history.

(56) References Cited

U.S. PATENT DOCUMENTS

| 8,781,621 | B2 | 7/2014 | Hirata et al. | |
|---|---|---|---|---|
| 8,838,872 | B2 | 9/2014 | Starr | |
| 9,334,117 | B2 | 5/2016 | Imai et al. | |
| 2014/0030049 | A1* | 1/2014 | Imai | B65G 1/137 414/273 |
| 2014/0031973 | A1* | 1/2014 | Hirata | G11B 15/689 700/218 |
| 2014/0142741 | A1* | 5/2014 | Hasegawa | G11B 23/0236 700/214 |
| 2014/0142742 | A1* | 5/2014 | Hasegawa | B65G 1/137 700/214 |

* cited by examiner

*Primary Examiner* — Kyle O Logan
(74) *Attorney, Agent, or Firm* — Fox Rothschild LLP

(57) ABSTRACT

A system and method for transporting one or more data storage cartridges between data storage library strings, including a plurality of data storage libraries, a plurality of shuttle connections coupled to the plurality of data storage libraries, and a plurality of shuttle cars movably housed within each of the plurality of shuttle connections. The system also includes at least one system controller, wherein the at least one system controller is configured to receive host commands and control movement of the shuttle cars between the plurality of data storage libraries, and the at least one system controller is configured to control movement of each of the shuttle cars such that at least one shuttle car is associated with each of the plurality of data storage libraries during operation of the system.

17 Claims, 8 Drawing Sheets

SYSTEM AND METHOD FOR DISTRIBUTING SHUTTLE CARS IN A DATA STORAGE LIBRARY SHUTTLE COMPLEX

BACKGROUND

The present disclosure relates to a data storage library having a plurality of library strings and, more specifically, to efficiently moving data storage cartridges between the library strings in a data storage library shuttle complex.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, COMPACTFLASH™, SMARTMEDIA™, MEMORY STICK™, etc.), or other suitable media. An example of a data storage cartridge that is widely employed in automated data storage libraries for mass data storage is a magnetic tape cartridge, or data storage cartridge.

In order to increase the capacity and capabilities of the automated data storage libraries, multi-library shuttle complexes have been developed, wherein a plurality of libraries (e.g., library strings, formed by connecting a plurality of library frames in a row), are connected by one or more shuttle connections (e.g., disposed atop and spanning between the library strings). One example of such a shuttle complex includes IBM System Storage TS3500. In a shuttle complex, a shuttle car is configured to move within each shuttle connection in order to deliver data storage cartridge(s) between library strings. Thus, a data storage cartridge(s) is able to be removed from a storage or drive location within one library string, placed within a shuttle car, delivered to a separate library string via a shuttle connection, and mounted in a drive or storage slot within the library frame of the separate library string specified as the destination location.

SUMMARY

In accordance with an aspect of the disclosure, a system for transporting one or more data storage cartridges between data storage library strings is disclosed. The system includes a a plurality of data storage libraries, a plurality of shuttle connections coupled to the plurality of data storage libraries, and a plurality of shuttle cars, wherein at least one of the plurality of shuttle cars is movably housed within each of the plurality of shuttle connections, each of the shuttle cars being configured for movement between each of the plurality of data storage libraries via a corresponding shuttle connection. The system also includes at least one system controller, wherein the at least one system controller is configured to receive host commands and control movement of the shuttle cars between the plurality of data storage libraries, and further wherein the at least one system controller is configured to control movement of each of the shuttle cars such that at least one shuttle car is associated with each of the plurality of data storage libraries during operation of the system.

In accordance with another aspect of the disclosure, a method of moving shuttle cars within a data storage library shuttle complex is disclosed. The method includes providing a plurality of data storage libraries, providing a plurality of shuttle connections coupled between the plurality of data storage libraries, wherein the number of shuttle connections is equal to or greater than the number of data storage libraries, and providing at least one shuttle car in each of the plurality of shuttle connections, wherein each shuttle car is configured to move between the plurality of data storage libraries. The method also includes moving a first shuttle car from a first data storage library to a second data storage library based on a first command, and moving a second shuttle car from one of the plurality of data storage libraries to the first data storage library based on a second command.

According to another aspect of the disclosure, a system is disclosed which includes a shuttle complex having a plurality of data storage libraries connected by a plurality of shuttle connections, wherein each of the plurality of shuttle connections comprises a shuttle car able to move within the respective shuttle connection, and further wherein each of the data storage libraries comprises at least one data storage cartridge stored therein. The system also includes a system controller comprising a processing device, and a non-transitory, computer-readable memory containing programming instructions that are configured to cause the processing device to receive a first command to move at least one data storage cartridge from a first data storage library to a second data storage library, search for an available first shuttle car within the plurality of shuttle connections connected to the first data storage library, and execute the moving process corresponding to the first command using the first shuttle car. The programming instructions also cause the processing device to select a second command to move a second shuttle car from one of the plurality of data storage libraries to the first data storage library, search for an available second shuttle car from among the plurality of data storage libraries; and, execute the moving process corresponding to the second command to move the second shuttle car to the first data storage library.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
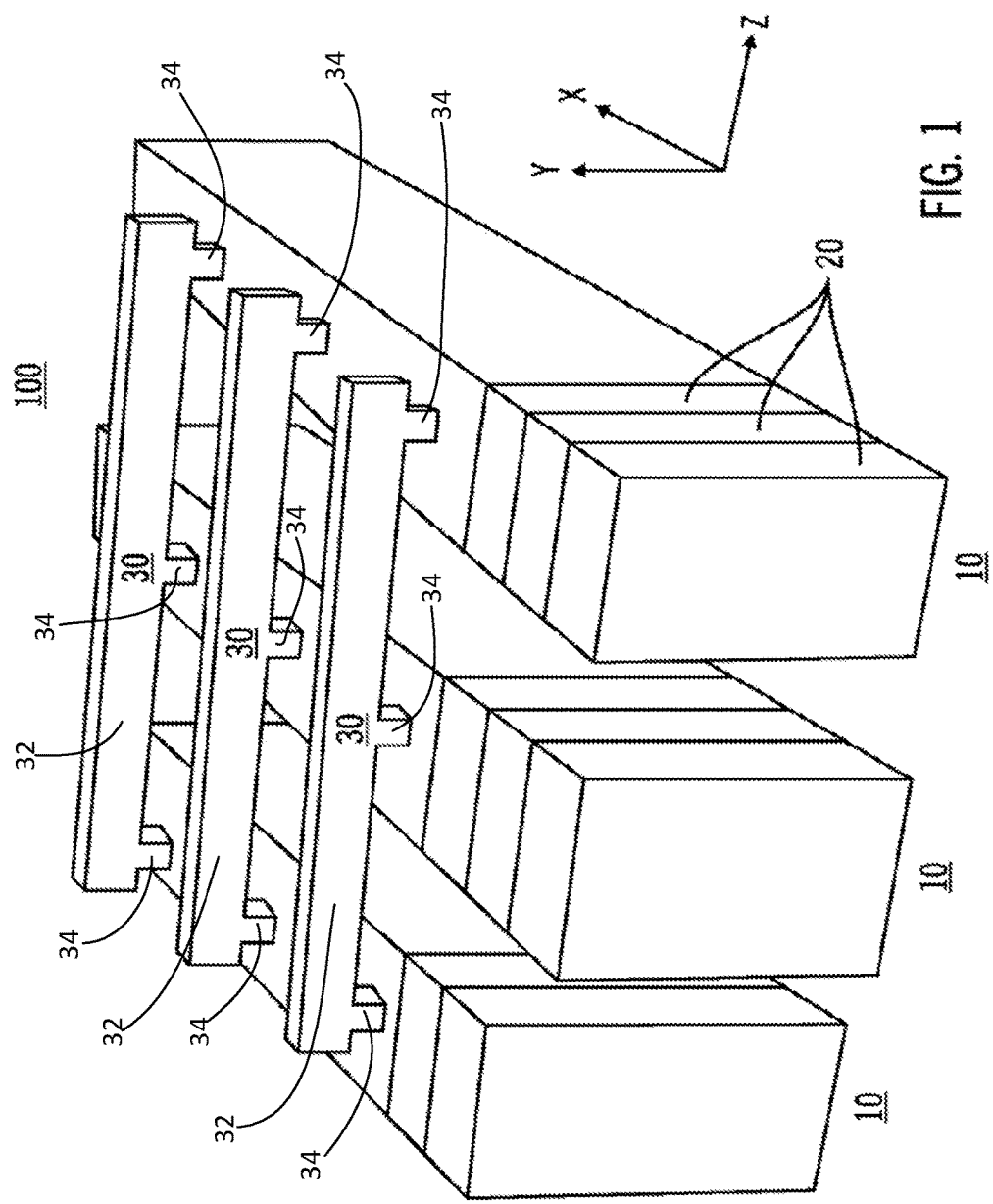
FIG. 1 is a perspective view of a shuttle complex according to one aspect.

Referring to FIG. 1, one embodiment of a data storage library is illustrated. Specifically, FIG. 1 is a perspective view of a shuttle complex 100 in accordance with an aspect of the disclosure. Shuttle complex 100 includes three library strings 10, as well as three shuttle connections 30 arranged atop the three library strings 10, with the three shuttle connections 30 interconnecting each of the three library strings 10. Each of the library strings 10 includes a plurality of library frames 20 connected in rows in the X direction. The shuttle connections 30 each have a shuttle span 32 extending between respective library strings 10 in the Z direction, along with three shuttle stations 34, wherein each respective shuttle station 34 extends downward in the Y direction so as to connect the shuttle span 32 with each library string 10.

While three library strings 10 are shown in FIG. 1, it is to be understood that the number of library strings 10 in a shuttle complex 100 is not limited to three, as more or fewer library strings may be present based on capacity needs, customer preferences, space limitations, etc. Relatedly, the number of shuttle connections 30 is also not limited to three. As will be set forth in further detail below, the number of shuttle connections 30 is preferably equal to the number of library strings 10. However, a number of shuttle connections 30 greater than the number of library strings 10 may be chosen, but may be limited based on, for example, the length of the library strings 10 in the X direction. The length of the shuttle connections 30 in the Z direction may be extended as the number of library strings 10 is increased, with more or less shuttle stations 34 being connected to the shuttle spans 32 based on the number of library strings 10 present in the Z direction.

While not shown in FIG. 1, a shuttle car may be arranged inside each respective shuttle connection 30, wherein the shuttle car is configured to move upon rails or other means of guidance within the shuttle connections 30, both vertically through shuttle stations 34 and horizontally through shuttle spans 32. With such a configuration, at least one data storage cartridge from within one library string 10 may be loaded and/or coupled onto (or into) a shuttle car within a library string, and the at least one data storage cartridge may be moved to another library string 10 via a shuttle connection 30. In one aspect, the component or data storage cartridge will be transported by a robotic accessor inside the library string 10 and transferred to the shuttle car associated with the shuttle connection 30 for transport within the shuttle connection to the desired library string 10. While FIG. 1 and the accompanying description comprises a shuttle car movably housed in a shuttle connection, it may not be enclosed. For example, the car may ride on a track, rails, trough, etc. without being completely encased in an enclosure. Herein, a car movably housed in a shuttle connection may refer to a car that is fully enclosed, partially enclosed, or not enclosed at all. Herein, shuttle car may refer to an apparatus that moves one or more library components (e.g., data storage cartridges) on, in, around or through a shuttle span using wheels, rollers, guides, rails, liquid, or air. A shuttle span may refer to an apparatus that links two or more data storage libraries together (e.g., a rail, trough, bridge, container, tunnel, track, etc.). A station may refer to a location or apparatus where a library component, such as a data storage cartridge, is delivered to a data storage library (e.g., hole, opening, door, arch, tunnel, elevator, shaft, etc.). A station may have common elements or may be an extension of a span (e.g., comprising a rail, trough, bridge, container, tunnel, track, etc.). A connection may refer to an apparatus that couples two or more libraries together using stations, spans and cars. A car transports one or more components between a plurality of data storage libraries using a connection.

Figure 2:
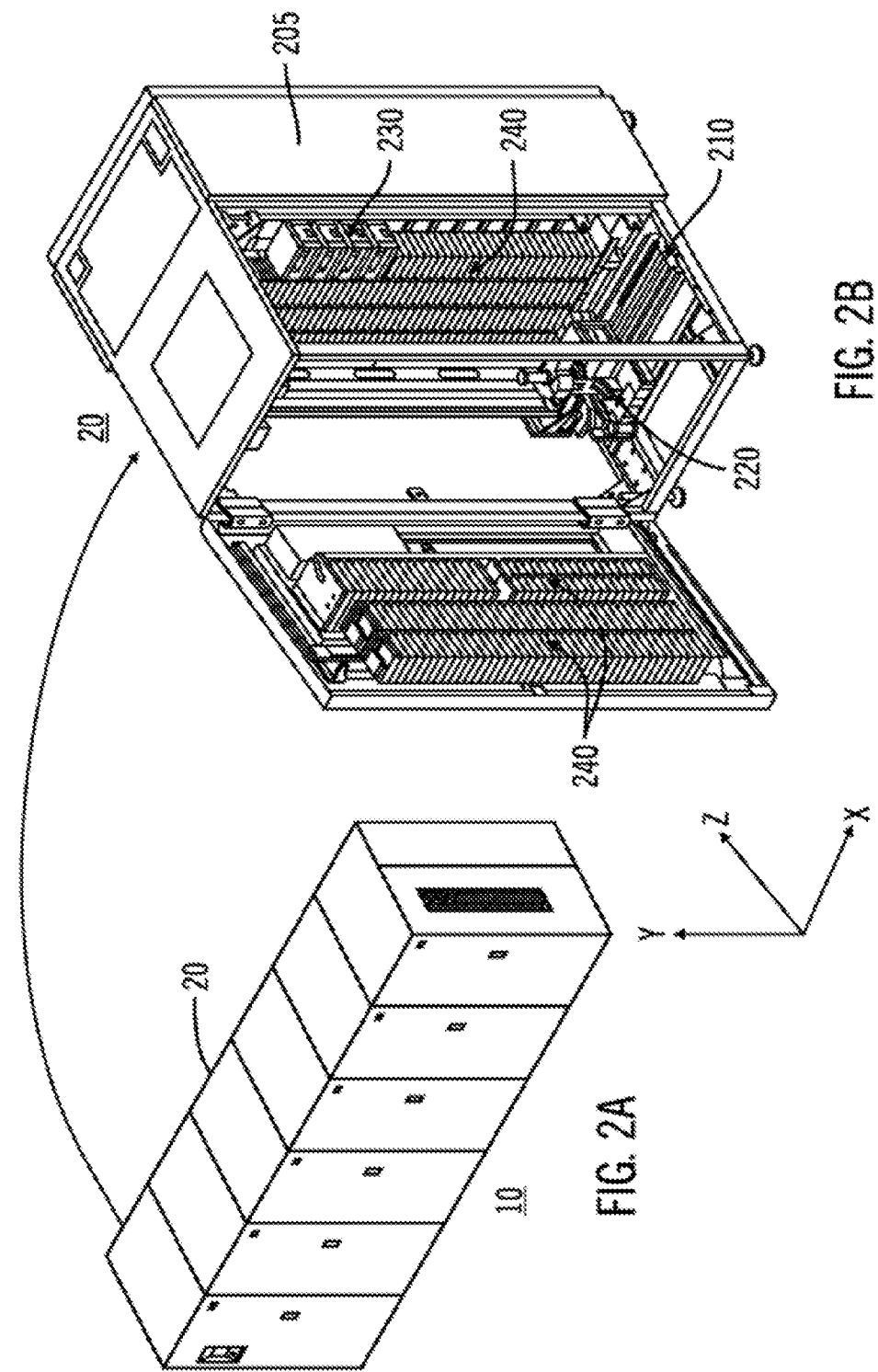
FIG. 2A is a perspective view a data storage library string in accordance with one aspect.
FIG. 2B is a perspective view of the interior of a storage frame from the data storage library string of FIG. 2A.

Referring now to FIGS. 2A and 2B, perspective views of a library string 10 and a library frame 20 constituting a portion of the library string 10 are shown. FIG. 2A is an example of a single library string 10, wherein library string 10 includes six connected library frames 20. It is to be understood that more or fewer library frames 20 may be utilized in a library string 10. FIG. 2B illustrates an enlarged, interior view of a single library frame 20. The library frame 20 includes a housing or enclosure 205. Within housing 205 is a robotic accessor 220, which is capable of movement along a passageway and/or track (e.g., rails 210) in the X direction and along a passageway (e.g., rails) in the Y direction (not shown).

While not shown, it is to be understood that accessor 220 may move between multiple interconnected library frames 20. That is, the track 210 in the X direction may be connected to the track inside the adjacent library frames 20, and the robotic accessor 220 is able to move through more than one of the six connected library frames 20 along the respective tracks. One or more data storage drives 230 may be disposed within the frame(s), with the data storage drive(s) being configured for mounting data storage cartridges therein to read and/or write data from or to the data storage cartridges. Additionally, a plurality of storage slots 240 may be housed within the library frame 20, with each slot 240 capable of accommodating one or more data storage cartridges therein. The robotic accessor 220 may retrieve and hold one or more data storage cartridges, move along the horizontal and/or vertical directions within the library frame(s) 20, and mount the data storage cartridge(s) in a specified data storage drive 230 and/or slot 240. Any number of data storage drives 230 may be selected and arranged according to the type of storage medium (e.g., magnetic tape, magneto-optical medium, etc.) and the type of data storage cartridge (e.g., optical disk, magnetic disk, optical tape, magnetic tape, 3592, LTO, etc.). While references are made to library frames, some libraries may not use frames for expansion and some libraries may not be expandable. Herein, frame may refer to an expansion component of a library, an expandable library and/or a non-expandable library. While references are made to library strings, some libraries may not form strings (e.g., they may be expanded forming blocks or cylinders) and some libraries may not be expandable. Herein, library string may refer to any library, expandable or not expandable, and regardless of how a library expansion occurs.

Figure 3:
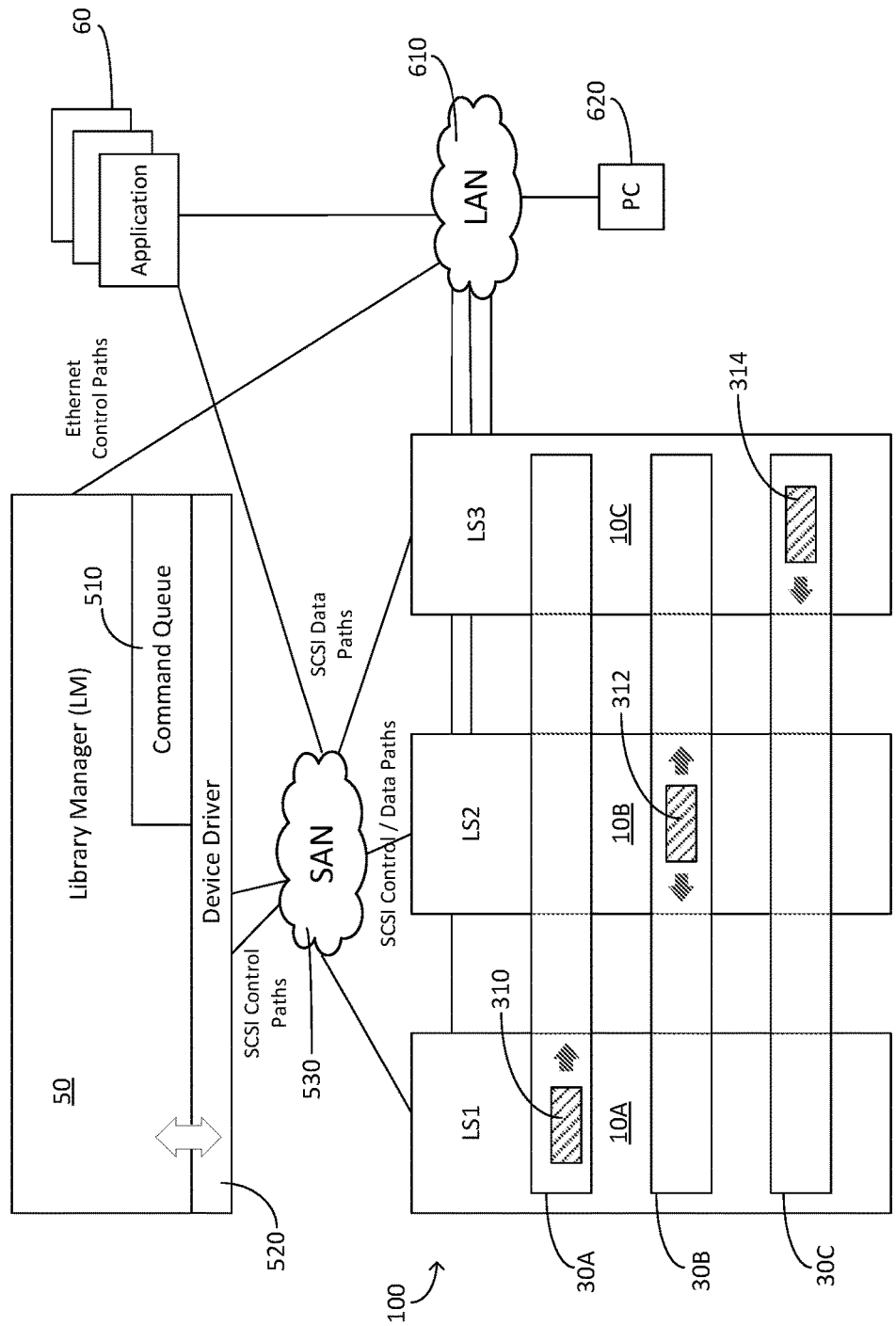
FIG. 3 is a schematic diagram of a shuttle complex in accordance with one aspect of the disclosure.

Referring to FIG. 3, a diagram of a data storage library system is illustrated. The shuttle complex 100 includes three library strings 10 (10A, 10B, 10C), as well as three shuttle connections 30 (30A, 30B, 30C) connected to each of library strings 10A-10C. As discussed above with respect to FIG. 1, it is to be understood that more or less library strings 10 may be present, preferably with the number of shuttle connections 30 being equal to or greater than the number of library strings 10. Respective shuttle cars 310, 312, 314 are provided within respective shuttle connections 30A, 30B, 30C, with shuttle cars 310, 312, 314 being configured to move both horizontally and vertically within the shuttle connections 30A, 30B, 30C, as discussed above. In this way, shuttle cars 310, 312, 314 may each pass through their respective shuttle connections 30A, 30B, 30C to each library string 10A, 10B, 10C. This configuration allows the shuttle cars 310, 312, 314 to transport one or more data storage cartridges to each library string 10A, 10B, 10C, without having to transport the data storage cartridge(s) (and/or shuttle car) from one shuttle connection to another in order to for the data storage cartridge(s) to travel between all library strings.

Each library string 10 and shuttle connection 30 may be controlled by a system controller, such as a library manager 50, via a network (e.g., storage area network (SAN) 530). Herein, a system controller may comprise a dedicated controller (e.g., library manager 50), a library controller (e.g., a controller associated with library 10 of FIG. 2A), a distributed library control system (e.g., a plurality of controllers associated with library 10 of FIG. 2A), another distributed control system (e.g., controllers associated with a plurality of libraries 10 of FIG. 1), a host computer, or any other controller or control system, or combinations thereof, that is capable of providing commands, controls or instructions to move a shuttle car. The library strings 10 exchange (i.e., read/write) data with an application 60 via the SAN 530. Alternatively or additionally, the library strings 10 are able to communicate with the application 60 and each terminal or personal computer (PC) 620 via a local area network (LAN) 610. The application 60 may be dedicated software used to mount data storage cartridges into data storage drives and/or exchange data. An example of such software is the IBM Tivoli Storage Manager.

The library manager 50 may be a single software package performing virtual central control of the data storage drives 230 and data storage cartridges between the application 60 and each library string 10. An example of a library manager 50 is IBM Tape System Library Manager (TSLM). The library manager 50 may temporarily store commands from the application 60 in a command queue 510, while controlling device drivers and outputting, for example, a Small Computer System Interface (SCSI) command for each command to the library strings 10. The library manager 50 can also be a single software package or single appliance outside of the library, as shown in the drawing, or firmware inside the data storage library.

In a configuration incorporating a library manager 50, the application 60 need only issue a request to a library manager 50 when a library including a data storage cartridge is to be used, and the library manager 50 may be capable of managing and allocating the actual data storage cartridges. In this way, it may be easier to share data storage cartridges between library strings 10, as the library manager 50 may be capable of managing all operations, and each application 60 does not require awareness of system changes each and every time the configuration is changed to add or remove library frames, shuttle connections and/or library strings.

While a single library manager 50 is described above, it is to be understood that two or more libraries (and library managers) may work cooperatively to control movement of data storage cartridges between library strings. Alternatively and/or additionally, one or more external controllers (e.g., a controller for a complex of interconnected libraries) and/or one or more host computers (e.g., a device driver or host application) may control movement of the data storage cartridges between library strings via the shuttle cars.

In previous configurations for moving data storage cartridges between library strings, when no shuttle car was located within the library string at the departure point, an available (i.e., empty) shuttle car needed to be moved through a shuttle connection from a nearby library string before the data storage cartridge(s) was able to be loaded into the shuttle car and moved to the library string that represented the destination point. However, in such a scenario, the overall time required to move data storage cartridges between library strings is extended and takes longer due to the movement of empty shuttle cars, and the amount of time required to move empty shuttle cars similarly increases as both the traveling distances of data storage cartridges and the number of traveling runs increases. Accordingly, aspects of the present disclosure include systems and methods for ensuring that an empty shuttle car (or shuttle cars) is available at every library string such that the time needed for movement of data storage cartridges between library strings does not increase due to the wait for an available, empty shuttle car to travel to a departure point.

Figure 4:
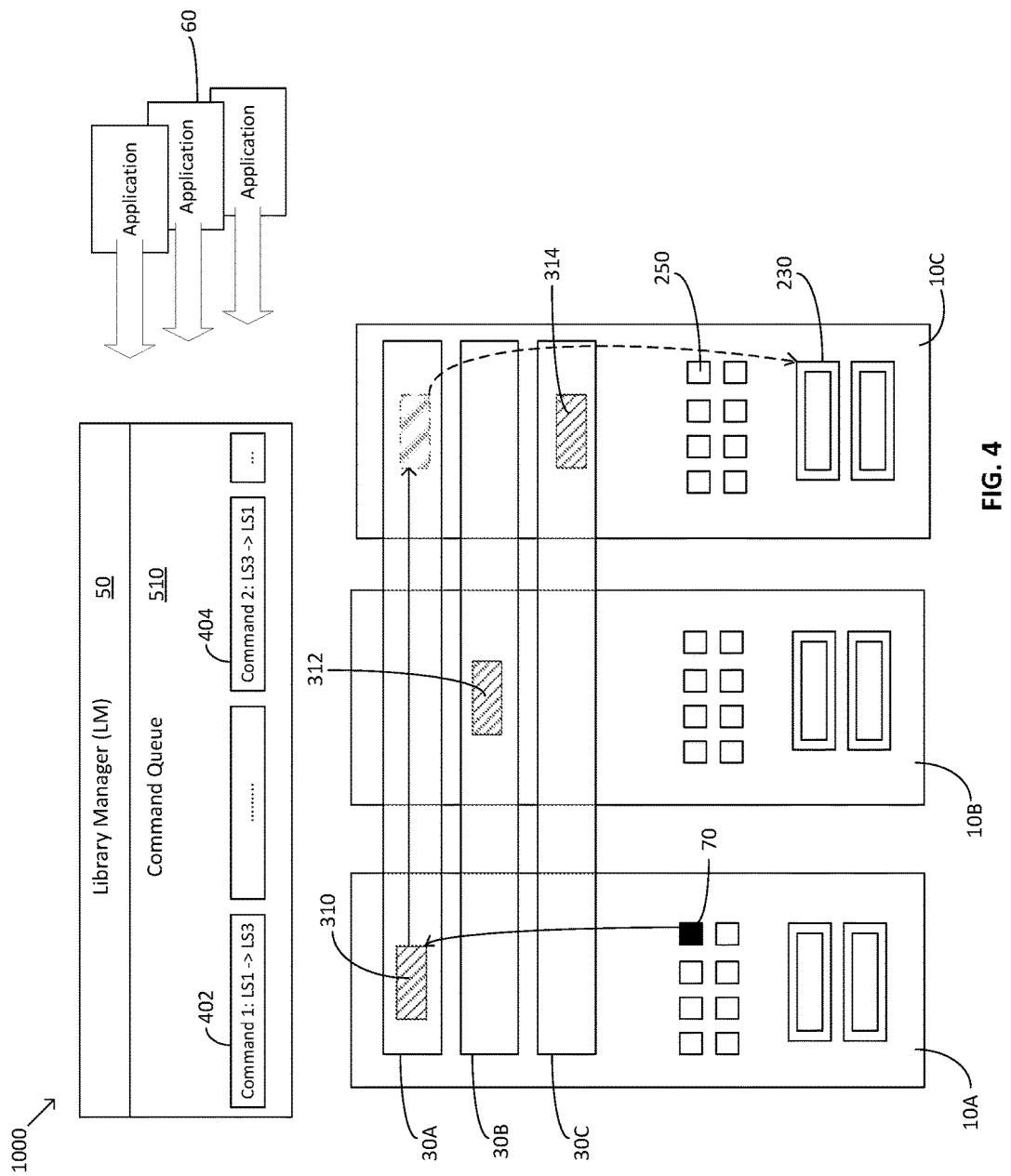
FIG. 4 is a schematic diagram of shuttle car movement within a shuttle complex in accordance with one aspect of the disclosure.
Figure 5:
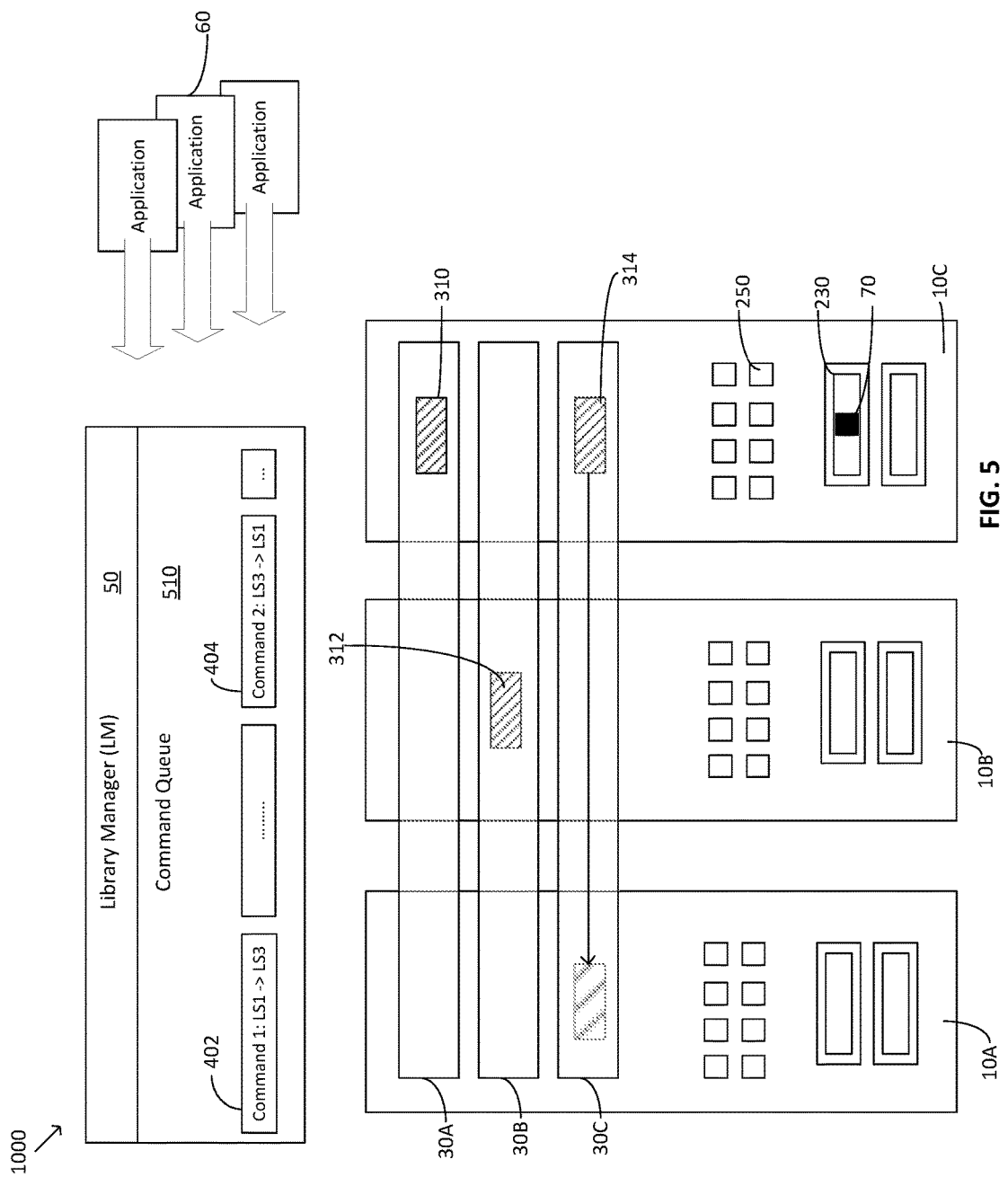
FIG. 5 is a schematic diagram of shuttle car movement within a shuttle complex in accordance with one aspect of the disclosure.

Referring to FIG. 4 and FIG. 5, a system 1000 for moving data storage cartridges between library strings is illustrated, with the system 1000 utilizing the system configuration described above with respect to FIG. 3. In FIG. 4, the library manager 50 may receive a remote mounting command (LS1→LS3, e.g., move cartridge from library string 10A (LS1) to library string 10C (LS3)) 402 from the application 60, with remote mounting command 402 being placed in the command queue 510. The remote mounting command 402 is specifically a command to move a data storage cartridge 70 from its stored position in a storage slot (e.g. storage slot 240 shown in FIG. 2B) within library string 10A to a data storage drive 230 within the library string 10C. Accordingly, data storage cartridge 70 must be delivered to one of shuttle cars 310, 312, 314 via, for example, a robotic accessor, as described above with respect to FIG. 2. As shown in FIG. 4, shuttle car 310 is present within library string 10A via shuttle connection 30A. The library manager 50 commands the robotic accessor (not shown) to load the data storage cartridge 70 in library string 10A into shuttle car 310. In this way, the system need not wait for one of shuttle cars 312, 314 to be moved to library string 10A, thereby reducing the time for delivery of the data storage cartridge 70 into an available shuttle car.

When data storage cartridge 70 has been loaded into shuttle car 310, shuttle car 310 may be controlled to travel through shuttle connection 30A directly to library string 10C, as shown in phantom in FIG. 4. Once shuttle car 310 has arrived at library string 10C, a robotic accessor (not shown) housed within library string 10C may retrieve data storage cartridge 70 from shuttle car 310 and deliver data storage cartridge 70 to a data storage drive 230 within library string 10C, as per remote mounting command 402.

While FIG. 4 shows that shuttle cars 310, 312, 314 are originally located in both respective shuttle connections 30A, 30B, 30C and respective library strings 10A, 10B, 10C, movement of shuttle car 310 to library string 10C in accordance with remote mounting command 402 causes library string 10A to have no shuttle cars present, while library string 10C has two shuttle cars, shuttle car 310 in shuttle connection 30A and shuttle car 314 in shuttle connection 30C, as illustrated in FIG. 5. If such a configuration were to remain, receipt of a later command from application 60 to retrieve another data storage cartridge or other component from library string 10A would result in system delay, as no shuttle car would be available within library string 10A for delivery of the data storage cartridge, at least until one of the shuttle cars 310, 312, 314 could be moved to library string 10A from their respective positions within library strings 10B and 10C.

However, in accordance with an aspect of the present system and methods, in order to avoid and/or prevent such delay, system 1000 further comprises an automatic shuttle car vacancy command 404, wherein one of shuttle cars 310, 312, 314 is automatically moved to a vacant library string before, during, or after delivery of a data storage cartridge or other component from that now vacant library string to another, separate library string. For example, referring to FIG. 5, after delivery of data storage cartridge 70 into a data storage drive 230 of library string 10C, both shuttle car 310 and shuttle car 314 are located within library string 10C, while library string 10A is vacant. Such a vacancy is only temporary, however, as library manager 50 may issue a shuttle car vacancy command (LS3→LS1) 404, which automatically provides instructions to move shuttle car 314 from library string 10C (LS3) to library string 10A (LS1) via shuttle connection 30C, as is shown in phantom in FIG. 5. In this way, equilibrium of the shuttle cars in system 1000 may be maintained, as each library string 10A, 10B, 10C contains a shuttle car therein, with each shuttle car prepared to accept a data storage cartridge or other component therein for delivery to another library string in the library complex. Alternatively, library manager 50 may issue a shuttle car vacancy command (LS3→LS1) 404 after receipt of a command from the application 60 that results in remote mounting command (LS1→LS3) 402, but before actually initiating the remote mounting command. Still further, library manager 50 may issue a shuttle car vacancy command (LS3→LS1) 404 after initiating remote mounting command (LS1→LS3) 402, but before the command actually completes.

While FIG. 5 shows shuttle car 314 being moved to vacant library string 10A after delivery of data storage cartridge 70 to library string 10C, it is to be understood that, alternatively, shuttle car 310 may be returned to its origin point in library string 10A after delivery of data storage cartridge 70, as the movement of a shuttle car to the vacant library string may not occur until after delivery of a data storage cartridge or other component. Thus, shuttle car 310 may already be empty at the time of receipt of the shuttle car vacancy command 404.

In accordance with one aspect of the disclosure, the time between delivery of the data storage cartridge or other component to the desired destination point and the shuttle car vacancy command (and, thus, return of a shuttle car to a vacant library string) is preferably minimal (e.g., 0-30 seconds), thereby reducing the possibility that a shuttle car is not present within a library string when a remote mounting command is received. However, it is to be understood that the time between delivery of the data storage cartridge or other component and the shuttle car vacancy command may be shorter or longer than the preferred range of 0-5 seconds.

Figure 6:
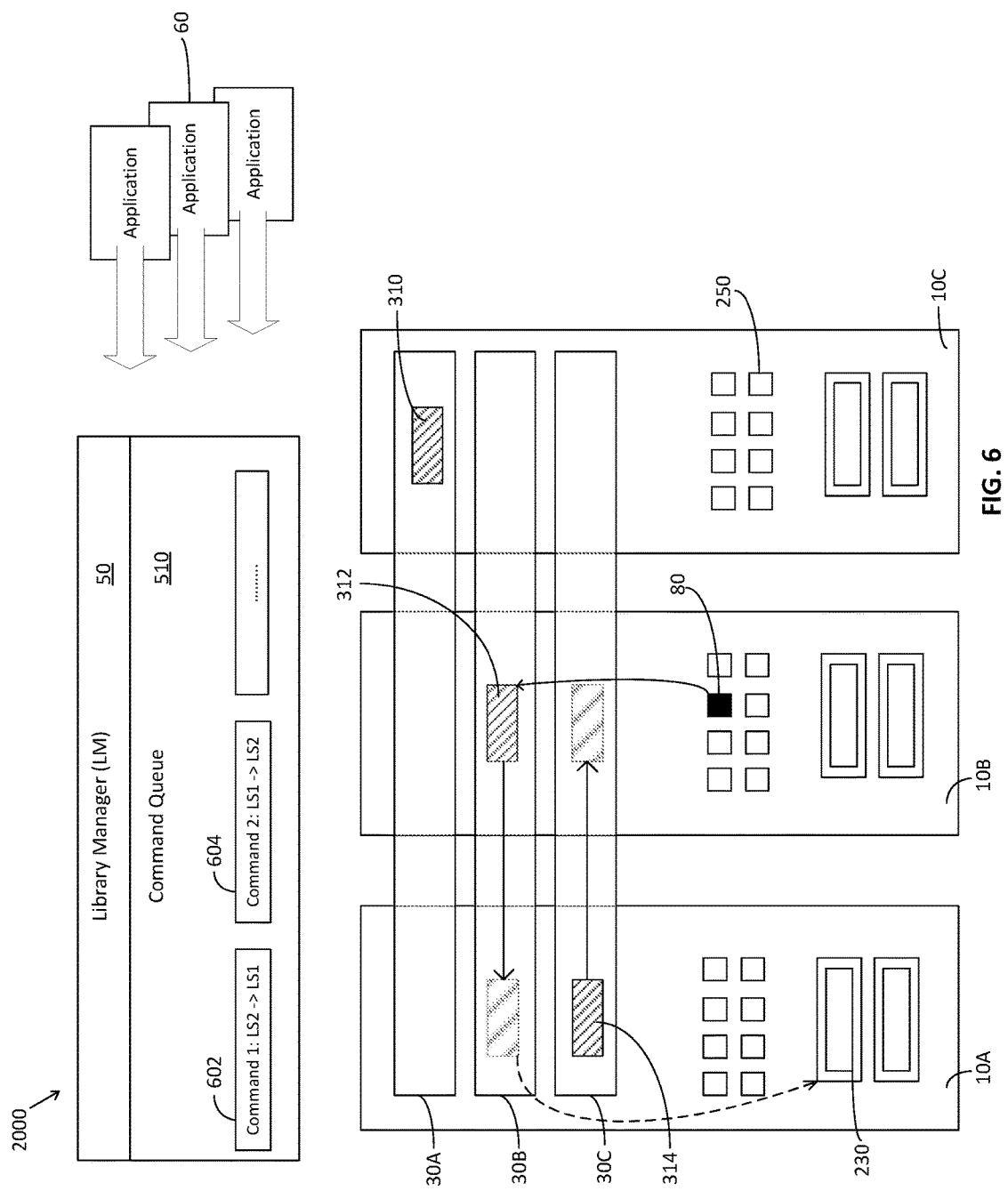
FIG. 6 is a schematic diagram of shuttle car movement within a shuttle complex in accordance with another aspect of the disclosure.
Figure 7:
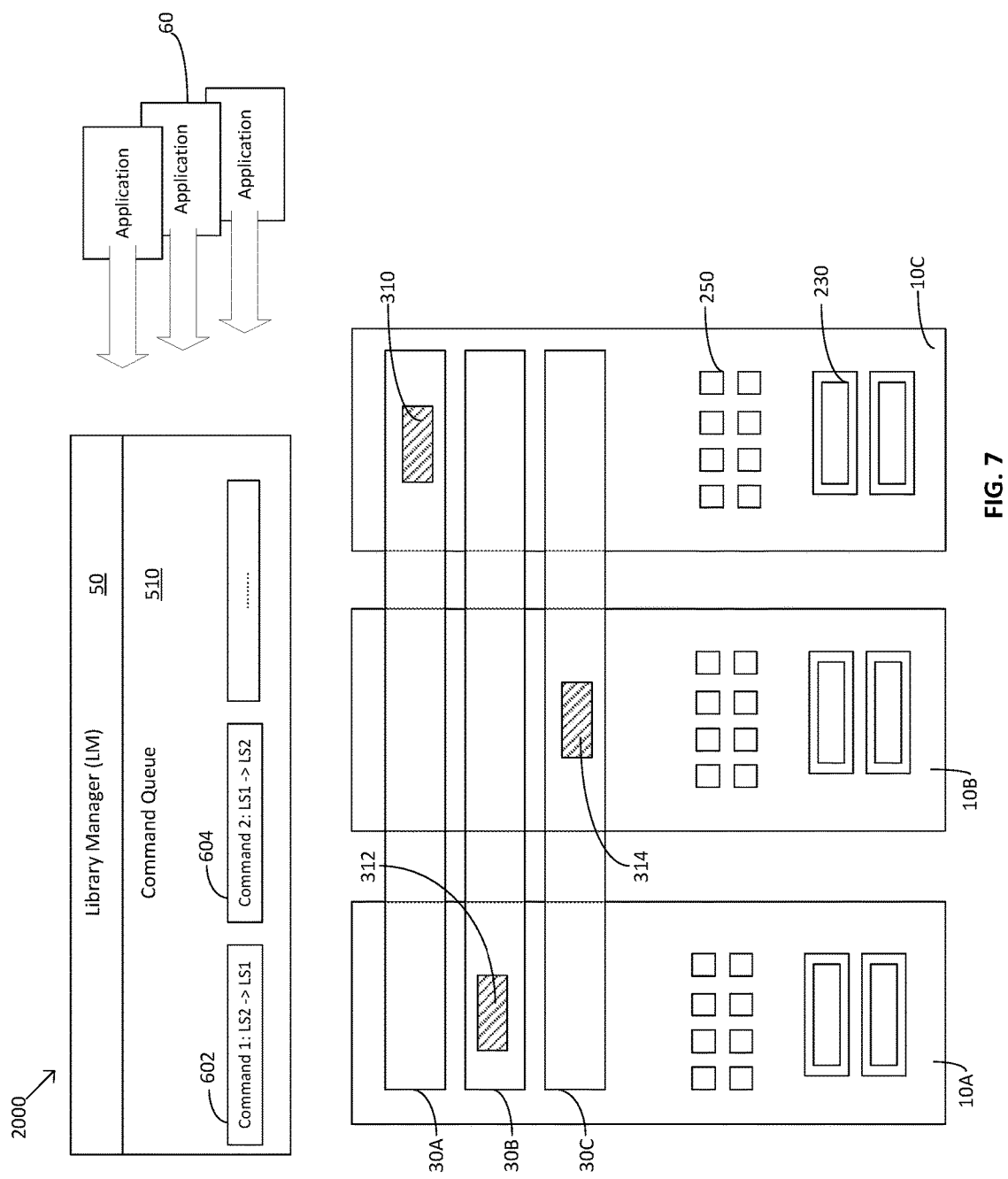
FIG. 7 is a schematic diagram of shuttle car movement within a shuttle complex in accordance with another aspect of the disclosure.

Referring now to FIGS. 6-7, another aspect of the present disclosure is illustrated. While the system 1000 shown and described above in FIGS. 4-5 disclosed a system and method for delivering a shuttle car to a vacant library string only after delivery of a data storage cartridge or other component by another shuttle car out of that library string, the present disclosure is not limited as such. For example, in system 2000 shown in FIGS. 6-7, the library manager 50 may receive a command from the application 60 that results in remote mounting command (LS2→LS1) 602 to move a data storage cartridge 80 from its stored position in a storage slot (e.g., storage slot 240 shown in FIG. 2B) within library string 10B to a data storage drive 230 within the library string 10A. Accordingly, data storage cartridge 80 is delivered to shuttle car 312 via, for example, a robotic accessor. When data storage cartridge 80 has been loaded into shuttle car 312, shuttle car 312 may be controlled to travel through shuttle connection 30B directly to library string 10A, as shown in phantom in FIG. 6. Once shuttle car 312 has arrived at library string 10A, a robotic accessor (not shown) housed within library string 10A may retrieve data storage cartridge 80 from shuttle car 312 and deliver data storage cartridge 80 to a data storage drive 230 within library string 10A, as per remote mounting command 602.

Unlike system 1000 shown and described above with respect to FIGS. 4-5, system 2000 includes an automatic shuttle car vacancy command 604, which may be executed substantially simultaneously with remote mounting command 602. Accordingly, shuttle car vacancy command 604 may cause one of shuttle cars 310, 314 to be moved to library string 10B at substantially the same time as delivery of a data storage cartridge or other component from library string 10B to destination library string 10A. For example, referring to FIG. 6, while delivery of data storage cartridge 80 into shuttle car 312 and into a data storage drive 230 of library string 10A is taking place, shuttle car 314 may be controlled to be moved from library string 10A to library string 10B. In this way, substantially continuous equilibrium of the shuttle cars in system 2000 may be maintained, as each library string 10A, 10B, 10C contains a shuttle car therein, as illustrated in FIG. 7, with each shuttle car prepared to accept a data storage cartridge or other component therein for delivery to another library string in the library complex.

While system 1000 described above pertains to a system wherein a shuttle car is moved into a vacant library string only after movement of a shuttle car from that library string, and system 2000 pertains to a system wherein a shuttle car is moved into a soon-to-be vacant library string substantially simultaneously with movement of a shuttle car from that library string, the present disclosure is not limited to those aspects. For example, while not shown, in another aspect of the disclosure, a first shuttle car may move to a soon-to-be vacated library string prior to movement of a second shuttle car away from that library string. In such a scenario, the first shuttle car may originate from the library string which is the intended destination of the second shuttle car, thereby ensuring that equilibrium of shuttle cars in the system is maintained.

While systems and methods have been described and illustrated as having three library strings and an equal number of shuttle cars in an equal number of shuttle connections, it is contemplated that the systems, methods and processes may have more shuttle cars and/or more shuttle connections than library strings, and the shuttle cars in their respective shuttle connections may be controlled and programmed to have at least one shuttle car at the ready in each library string to receive a component and/or data storage cartridge.

Figure 8:
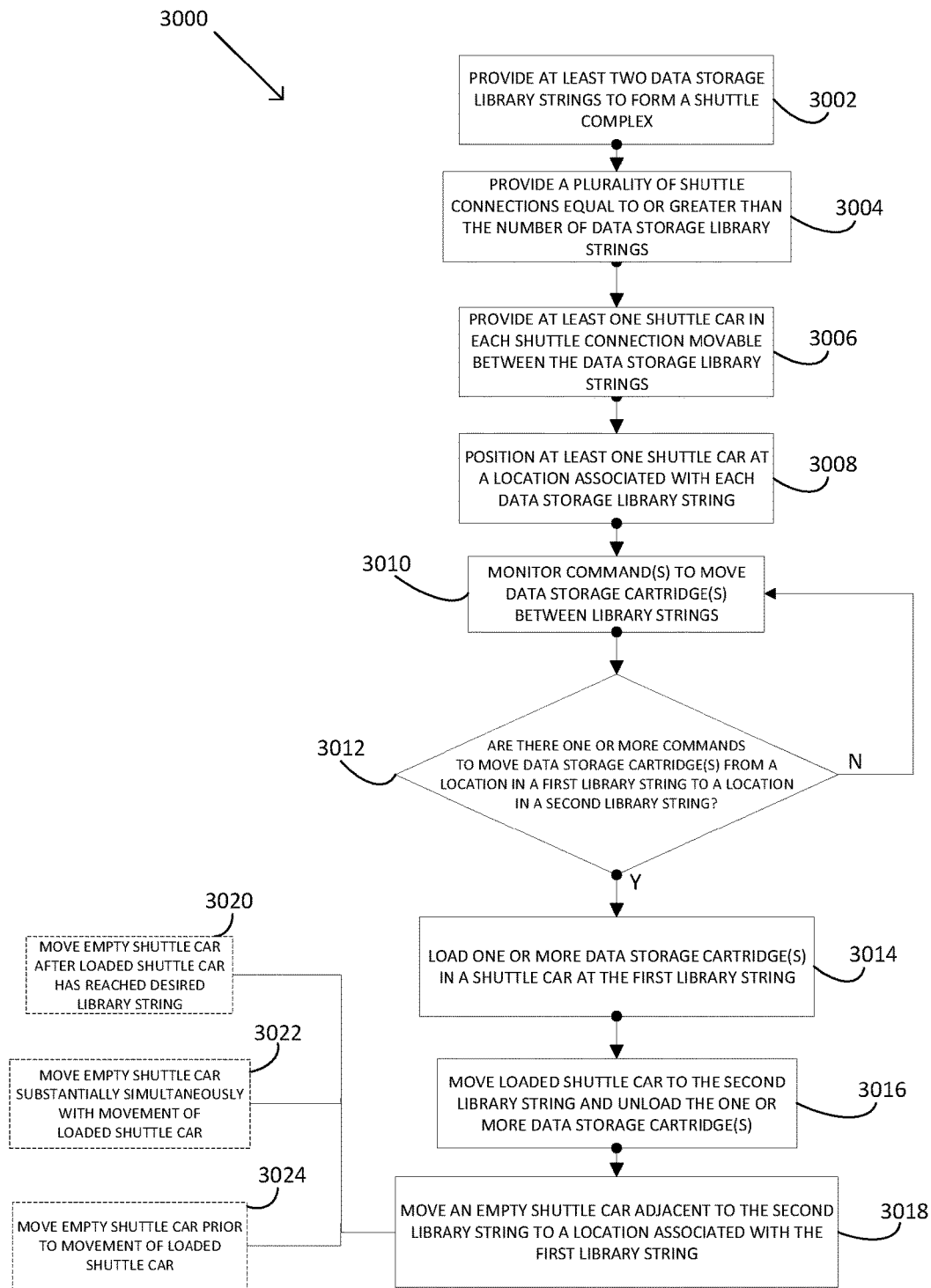
FIG. 8 is a flowchart of a method of distributing shuttle cars in a shuttle complex in accordance with another aspect.

Next, referring to FIG. 8, a process 3000 for moving one or more data storage cartridges between data storage library strings in a shuttle complex according to one embodiment is disclosed. While process 3000 is described for the sake of convenience and not with the intent of limiting the disclosure as comprising a series and/or number of steps, it is to be understood that the process does not need to be performed as a series of steps and/or the steps do not need to be performed in the order shown and described with respect to FIG. 8, but may be performed as an integral process and/or series of steps, in the order described or in an alternative order. At 3002, at least two data storage library strings are provided to form a shuttle complex. As described above, each of the data storage library strings include one or more interconnected data storage library frames, each configured to hold data storage cartridges and/or data storage drives therein. Next, at 3004, a corresponding number of shuttle connections equal to the number of data storage library strings are provided to span between all of the data storage library strings. For example, if four data storage library strings are present in the shuttle complex, four shuttle connections would span between all four library strings. As described above, there may be more shuttle connections than the number of library strings.

At 3006, at least one shuttle car is provided in each shuttle connection, preferably with each shuttle car being movable between each of the data storage library strings. In one aspect, the system and method may provide for more than one shuttle car in each shuttle connection. As described above, the shuttle cars are capable of interfacing with the data storage library strings such that one or more data storage cartridges within one data storage library string may be loaded onto a shuttle car via, for example, a robotic accessor, and the shuttle car may deliver the one or more data storage cartridges to a second data storage library string by way of a shuttle connection. At 3008, at least one shuttle car is positioned at a location directly adjacent to each data storage library string. In this way, at least one shuttle car is available at each data storage library string in the event that a command to move one or more data storage cartridges from a particular data storage library string is received, thereby reducing delay in moving data storage cartridge(s) to desired destination(s).

At 3010, commands to move one or more data storage cartridge(s) from one data storage library string to another data storage library string are monitored. The command(s) may come from a system controller (e.g., a library manager, a library controller, a host computer, or any other controller or control system and combinations thereof). At 3012, it is determined whether one or more commands to move the data storage cartridge(s) between data storage library strings is received. If no, the process continues to monitor for such commands. However, if yes, one or more data storage cartridges are loaded into a shuttle car at a first (departure) library string at 3014. At 3016, the loaded shuttle car is moved to a second (destination) library string, where the one or more data storage cartridges is unloaded for storage or use. The one or more commands may or may not include knowledge and/or information related to shuttle cars, shuttle connections, shuttle stations and/or other libraries. For example, the shuttle complex may be portrayed as a single very large library (or library image) where the one or more commands are further broken down into commands, instructions or movements for transporting the components (e.g., cartridges) between libraries.

At 3018, an empty shuttle car associated with (e.g., adjacent to) the second library string is moved to a location associated with (e.g., adjacent) the recently-vacated first library string. In this way, the second library string does not comprise two shuttle cars associated therewith (e.g., adjacent thereto), while the first library string would contain no shuttle cars associated therewith and at the ready to receive a data storage cartridge or other component. A shuttle car being "associated with" a library string includes situations in which the shuttle car is ready to receive a component or data storage cartridge, and also may include situations where the shuttle car is positioned adjacent to the library string, such as, for example, when the shuttle car is at, near, on, or in the shuttle station, or is otherwise contained within the enclosure of one or more of the library frames forming the library string.

Various options for moving the empty shuttle car to the first library string are possible. For example, at 3020, the empty shuttle car may be moved after the loaded shuttle car has reached the desired (destination) library string. Alternatively, at 3022, the empty shuttle car may be moved substantially simultaneously with the movement of the loaded shuttle car to the desired (destination) library string. Furthermore, as another alternative, at 3024, the empty shuttle car may be moved to the soon-to-be vacated departure library string prior to movement of the loaded shuttle car to the desired (destination) library string.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus. The memory elements can include local memory employed during actual execution of the program code, such as nonvolatile memory, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for transporting components between data storage libraries, the system comprising:
   a plurality of data storage libraries;
   a plurality of shuttle connections coupled to the plurality of data storage libraries;

a plurality of shuttle cars, wherein at least one of the plurality of shuttle cars is movably housed within each of the plurality of shuttle connections, each of the shuttle cars being configured for movement between each of the plurality of data storage libraries via a corresponding shuttle connection; and at least one system controller, wherein the at least one system controller is configured to receive host commands and control movement of the shuttle cars between the plurality of data storage libraries, and further wherein the at least one system controller is configured to control movement of each of the shuttle cars such that at least one shuttle car is associated with each of the plurality of data storage libraries during operation of the system, wherein the system controller is configured to move a first shuttle car from a position associated with a first data storage library to a position associated with a second data storage library after the second data storage library has been vacated by a second shuttle car.

2. The system of claim 1, wherein the number of shuttle connections is equal to or greater than the number of libraries.

3. The system of claim 1, wherein only a single shuttle car is associated with each shuttle connection.

4. The system of claim 1, wherein each of the plurality of shuttle connections comprises one or more shuttle spans extending between the plurality of data storage libraries and a plurality of shuttle stations coupled with each of the plurality of data storage libraries.

5. The system of claim 4, further comprising at least one robotic accessor movably housed within each of the plurality of data storage libraries, wherein the at least one robotic accessor is configured to interact with each of the plurality of shuttle stations.

6. The system of claim 5, wherein the robotic accessor and the shuttle cars are each configured to transport data storage cartridges.

7. A method of moving shuttle cars within a data storage library shuttle complex, the method comprising:
providing a plurality of data storage libraries;
providing a plurality of shuttle connections coupled between the plurality of data storage libraries, wherein the number of shuttle connections is equal to or greater than the number of data storage libraries;
providing at least one shuttle car in each of the plurality of shuttle connections, wherein each shuttle car is configured to move between the plurality of data storage libraries;
moving a first shuttle car from a first data storage library to a second data storage library based on a first command; and
moving a second shuttle car from one of the plurality of data storage libraries to the first data storage library based on a second command.

8. The method of claim 7, wherein the operation of moving the second shuttle car to the first data storage library takes place after the first shuttle car has reached the second data storage library.

9. The method of claim 7, wherein the operation of moving the second shuttle car to the first data storage library takes place during the operation of moving the first shuttle car to the second data storage library.

10. The method of claim 7, wherein the operation of moving the second shuttle car to the first data storage library takes place prior to the operation of moving the first shuttle car to the second data storage library.

11. The method of claim 7, further comprising transferring at least one component to the first shuttle car prior to the operation of moving the first shuttle car to the second data storage library.

12. The method of claim 7, further comprising positioning the shuttle car in each of the plurality of shuttle connections at a position directly adjacent to a separate respective data storage library such that each data storage library comprises at least one shuttle car positioned directly adjacent thereto.

13. A system comprising:
a shuttle complex having a plurality of data storage libraries connected by a plurality of shuttle connections, wherein each of the plurality of shuttle connections comprises a shuttle car able to move within the respective shuttle connection, and further wherein each of the data storage libraries comprises at least one data storage cartridge stored therein;
a system controller comprising a processing device; and
a non-transitory, computer-readable memory containing programming instructions that are configured to cause the processing device to:
receive a first command to move at least one data storage cartridge from a first data storage library to a second data storage library;
search for an available first shuttle car within the plurality of shuttle connections connected to the first data storage library;
execute the moving process corresponding to the first command using the first shuttle car;
select a second command to move a second shuttle car from one of the plurality of data storage libraries to the first data storage library;
search for an available second shuttle car from among the plurality of data storage libraries; and
execute the moving process corresponding to the second command to move the second shuttle car to the first data storage library.

14. The system of claim 13, further comprising programming instructions that are configured to cause the processing device to move the at least one first data storage cartridge to a specified location in the second data storage library.

15. The system of claim 13, wherein the execution of the moving process corresponding to the second command takes place after the execution of the moving process corresponding to the first command.

16. The system of claim 13, wherein the execution of the moving process corresponding to the second command takes place during the execution of the moving process corresponding to the first command.

17. The system of claim 13, wherein the execution of the moving process corresponding to the second command takes place prior to the execution of the moving process corresponding to the first command.

* * * * *